US008213954B2

(12) United States Patent
Gurney et al.

(10) Patent No.: US 8,213,954 B2
(45) Date of Patent: Jul. 3, 2012

(54) METHOD FOR ADDRESSING USER LOCATION ERRORS IN A COGNITIVE RADIO SYSTEM

(75) Inventors: David P. Gurney, Carpentersville, IL (US); Wayne W. Chiou, Sunrise, FL (US); Randy L. Ekl, Lake Zurich, IL (US); Douglas H. Weisman, Sunrise, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 917 days.

(21) Appl. No.: 11/845,940

(22) Filed: Aug. 28, 2007

(65) Prior Publication Data

US 2009/0061779 A1    Mar. 5, 2009

(51) Int. Cl.
*H04W 24/00* (2009.01)
(52) U.S. Cl. ............... 455/456.1; 455/404.2; 455/67.11
(58) Field of Classification Search ............... 455/456.1, 455/404.2, 67.11
See application file for complete search history.

(56) References Cited

U.S. PATENT DOCUMENTS

| 5,317,689 | A | | 5/1994 | Nack et al. | |
|---|---|---|---|---|---|
| 6,141,565 | A | * | 10/2000 | Feuerstein et al. | 455/560 |
| 6,249,252 | B1 | * | 6/2001 | Dupray | 342/450 |
| 6,356,758 | B1 | * | 3/2002 | Almeida et al. | 455/446 |
| 6,973,316 | B1 | * | 12/2005 | Hayakawa | 455/456.1 |
| 7,324,588 | B2 | * | 1/2008 | Green et al. | 375/224 |
| 7,474,646 | B2 | * | 1/2009 | Tamaki | 370/338 |
| 7,512,492 | B2 | * | 3/2009 | Irvin et al. | 701/213 |
| 2004/0072577 | A1 | * | 4/2004 | Myllymaki et al. | 455/456.1 |
| 2004/0171390 | A1 | * | 9/2004 | Chitrapu | 455/456.1 |
| 2004/0203875 | A1 | * | 10/2004 | Korneluk et al. | 455/456.1 |
| 2005/0239478 | A1 | * | 10/2005 | Spirito | 455/456.1 |
| 2007/0111746 | A1 | * | 5/2007 | Anderson | 455/522 |
| 2007/0223403 | A1 | * | 9/2007 | Furuskar et al. | 370/278 |
| 2007/0275734 | A1 | * | 11/2007 | Gaal et al. | 455/456.6 |
| 2008/0134276 | A1 | * | 6/2008 | Orrell et al. | 725/132 |
| 2008/0165754 | A1 | * | 7/2008 | Hu | 370/342 |

FOREIGN PATENT DOCUMENTS

| WO | 0036863 A | 6/2000 |
|---|---|---|
| WO | WO0036863 A1 | 6/2000 |

OTHER PUBLICATIONS

PCT International Search Report Application No. PCT/US2008/073970 Dated Jan. 1, 2001, 2009—pages.
FCC-04-113 Unlicensed Operation in the TV Broadcast Bands/Below 900 MHZ and in the 3 GHZ Band/ 38 pages, released May 25, 2004.
International Preliminary report on Patentability & Written Opinion for International Application No. PCT/US2008/073970 mailed on Mar. 11, 2010.
Office Action mailed Jul. 22, 2011, in European Patent Application No. 08798449.8, Motorola Solutions, Inc.
Office Action (Translation), mailed Jun. 8, 2011, in Korean Patent Application No. 10-2010-7006727, Motorola Solutions, Inc.

* cited by examiner

*Primary Examiner* — Jinsong Hu
*Assistant Examiner* — Qun Shen
(74) *Attorney, Agent, or Firm* — Barbra R. Doutre

(57) ABSTRACT

A cognitive radio (CR) system (102) includes CR units (108, 110) that determine and update location-based system operating parameters to avoid interference with other systems operating in the same frequency band. Operational Location Uncertainty region and Allowed Location Error regions can be applied. The CR unit trades off between both, available channels and maximum system operating parameters, such that as Location Uncertainty of the CR device increases, available CR channels and location-based CR system operating parameters decrease over a maximum network reach.

32 Claims, 6 Drawing Sheets

METHOD FOR ADDRESSING USER LOCATION ERRORS IN A COGNITIVE RADIO SYSTEM

FIELD OF THE INVENTION

The present invention relates generally to wireless communication systems and more particularly to location determination in cognitive radio.

BACKGROUND

Cognitive radios (CR) utilize a variety of co-existence techniques in order to attempt to operate successfully along with existing wireless communication networks or architectures. The CR concept is generally intended to enable frequency band sharing and reuse with incumbent users and/or other CR devices. The manner by which CR performance can be increased or extended, via the use of advanced cognitive techniques, is of current interest in the communications arena.

Wireless systems utilizing cognitive radio techniques are intended to allow a network or a wireless node to change its transmission or reception parameters to communicate efficiently and utilize spectrum on a secondary basis without interfering with incumbent users or other CR devices operating in the same frequency band. However, due to the wide variety of incumbent receiver equipment providers on the market and different field operating conditions, controlling the operating parameters of CR systems becomes a very challenging task. The mobility of many CR devices, such as portable radios, exacerbates the problem.

Accordingly, there is need to intelligently control system operating parameters within cognitive radio systems.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
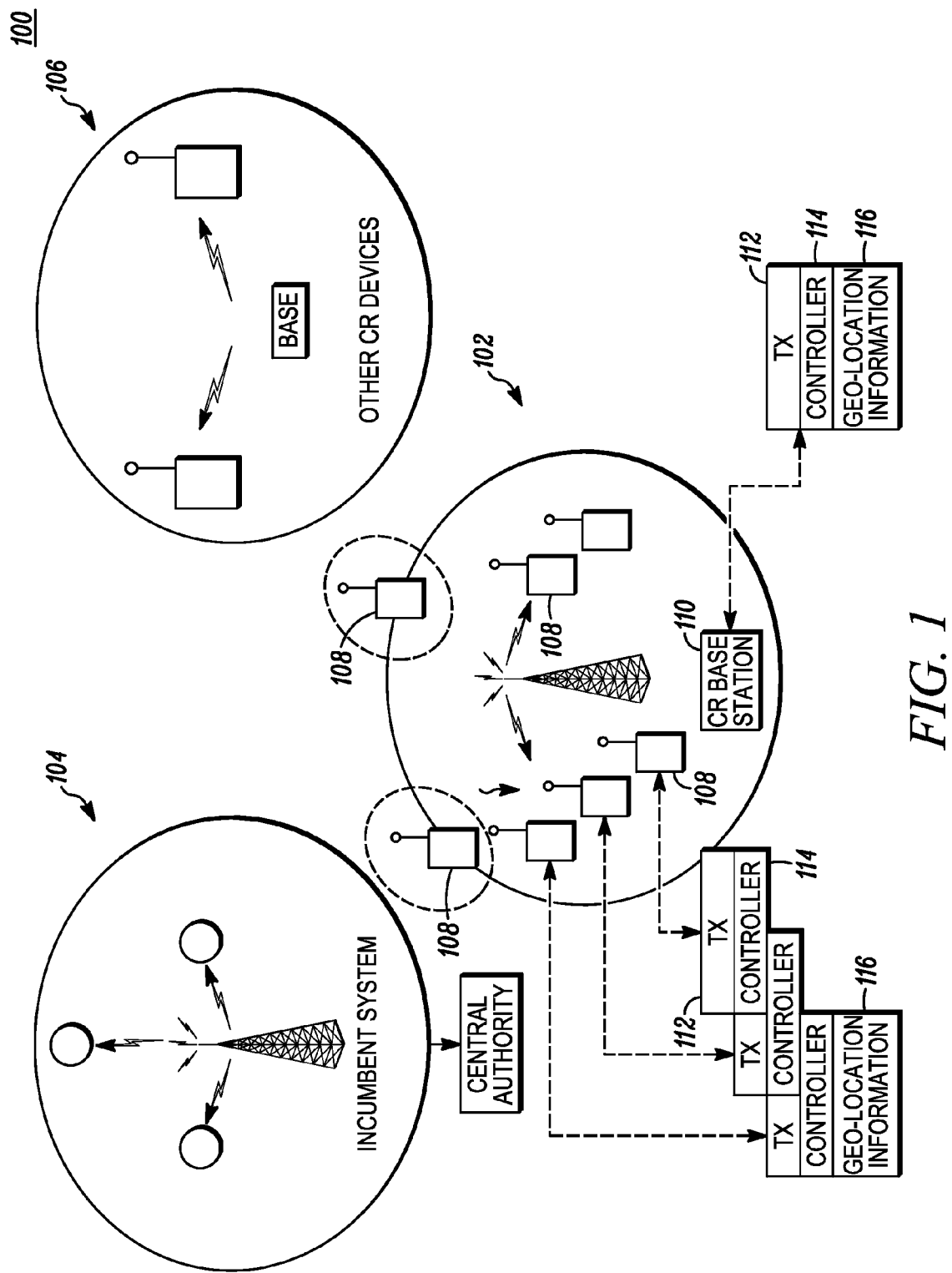
FIG. 1 illustrates a wireless communication network operating in according with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components for addressing several different forms of location error in a cognitive radio (CR) system. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions involved in determining location errors for a CR system and adjusting location-based system operating parameters in response thereto. The non-processor circuits may include, but are not limited to, a radio receiver, a radio transmitter, signal drivers, clock circuits, power source circuits, and user input devices. As such, these functions may be interpreted as steps of a method of updating CR system operating parameters to avoid interference between a CR unit and an incumbent system or other CR device. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Briefly, in accordance with the present invention, there is described herein a method and apparatus to trade-off user location accuracy versus CR operational parameters (e.g., system transmit power & network data throughput) in a manner that is conservative with respect to potential user location inaccuracy, yet favorable to the user in terms of regulatory requirements and network operating performance. Other CR system operating parameters, such as occupied bandwidth or transmit time duration, may be adjusted using similar techniques. Estimated or actual operating network size may be taken into account in the described method, as well as user mobility. A related method for reducing the storage requirements of large geo-location databases is also provided.

FIG. 1 illustrates a wireless communication network 100 operating in accordance with the present invention. Communication network 100 includes a cognitive radio (CR) system 102 operating in accordance with the present invention so as not to interfere with incumbent system 104 or other CR systems 106. Communication radio system 102 includes at least one CR unit. For the purposes of this application a CR unit can be either a subscriber CR device 108 or a CR base station 110. The subscriber CR device 108 is preferably a mobile device, such as a portable two-way radio, vehicle mounted radio, or the like. The CR base station 110 is preferably a stationary device, or a fixed portable device. In some cases, depending upon the type of communication system, the base station may also be moving.

In operation, CR subscriber devices 108 may communicate directly with each other and/or via the base station 110, depending on the type of network within which they are being used. Examples of wireless communication networks within which the CR units of the present invention are applicable, include but are not limited to, pubic safety networks, home wireless networks, and wide-area wireless broadband networks. The CR units of the present invention co-exist with incumbent system 104 and other CR system 106 in a manner to be described herein in accordance with various embodiments of the invention.

Each CR unit includes its' own transmitter and a controller 112, 114 respectively. The CR units 108, 110 rely on geo-location information 116 (either from geo-location algorithms or a geo-location database) contained in controller 114 in order to determine key CR system operating parameters (e.g., allowed transmit power, operational bandwidth, transmit time duration, etc.) versus location. In accordance with the an embodiment of the invention to be further described herein, each CR unit's transmitter 112 and controller 114 determines and updates its own location-based system operating parameters such that each CR unit performs a trade off between, (1) both available channels and system operating parameters (e.g., allowed transmit power), and (2) various aspects of location uncertainty. The tradeoff is performed such that as location uncertainty of the CR unit increases, available CR channels decrease and location-based CR system operating parameters are reduced, over a maximum network reach, while maintaining strict regulatory compliance. The described tradeoff control permits the CR units to co-exist and not interfere with incumbent system 104 or other CR systems 106, and simultaneously allows CR units to optimize their system operating parameters.

Figure 2:
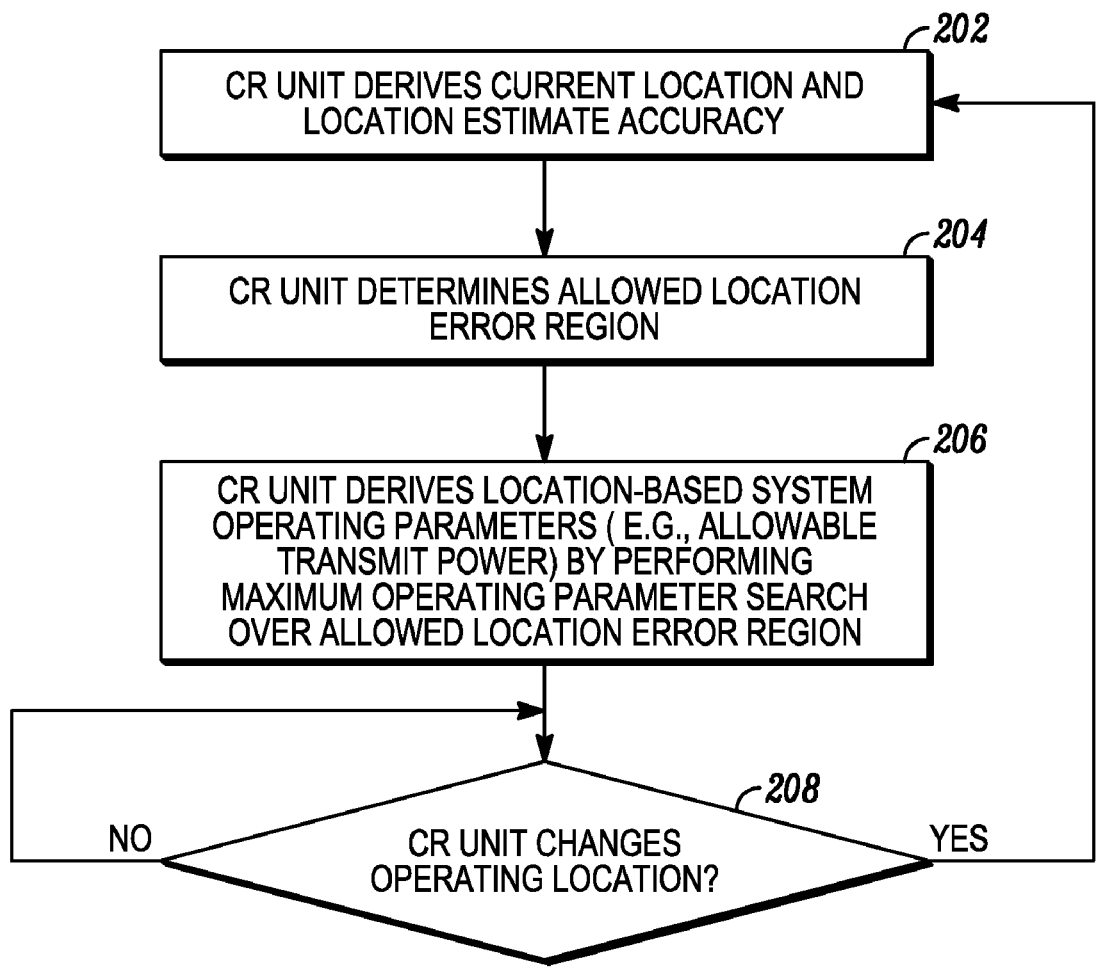
FIG. 2 illustrates a method of updating location-based system operating parameters for a cognitive radio (CR) unit in accordance with an embodiment of the invention.
Figure 3:
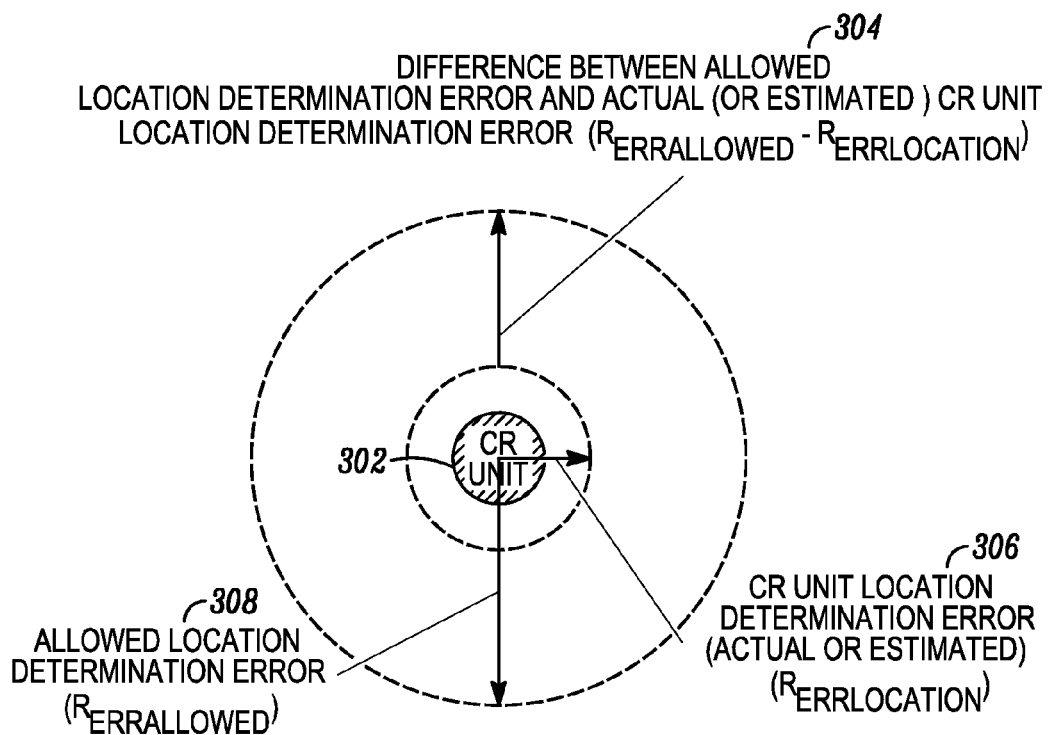
FIG. 3 illustrates the determination and application of an Allowed Location Error Region about the CR unit in accordance with an embodiment of the invention.
Figure 3:
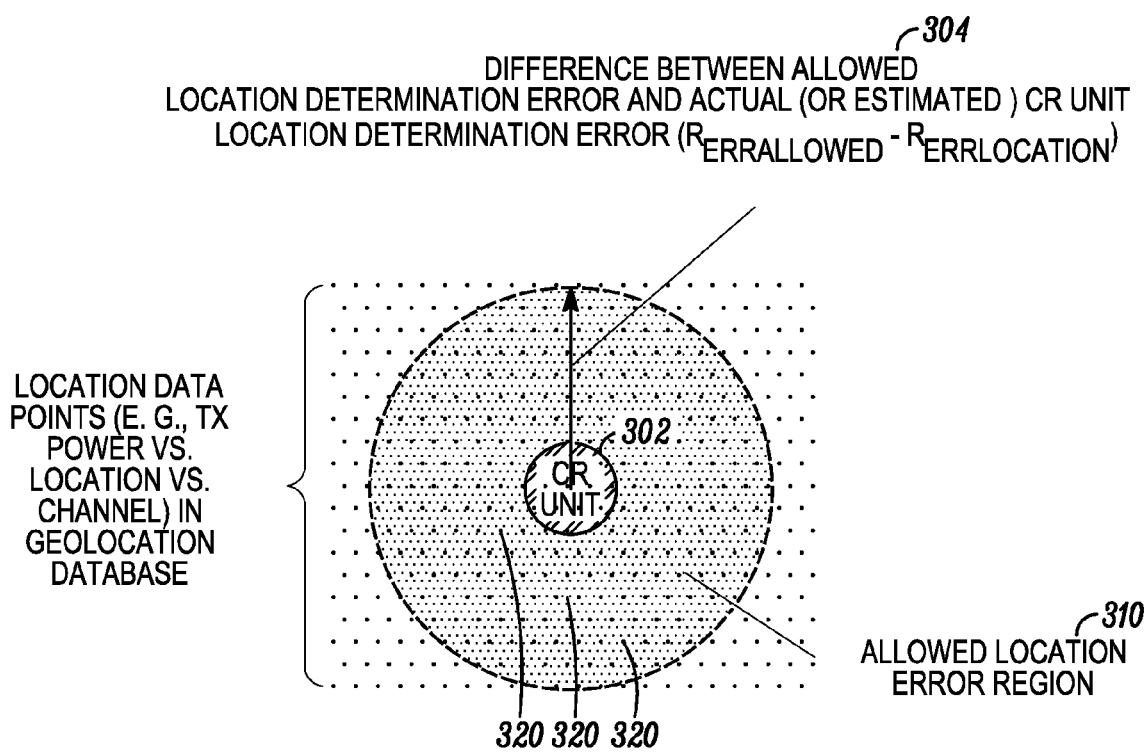

FIG. 2 illustrates a method of determining location-based system operating parameters for a cognitive radio (CR) unit in accordance with an embodiment of the invention. The CR unit being either a subscriber CR device or a CR base station. FIG. 3 illustrates the determination and application of an allowed location error region about the CR unit in accordance with an embodiment of the invention. The determination of location-based system operating parameters will be discussed in conjunction with both FIGS. 2 and 3. Method 200 begins at step 202 by deriving an operating location of the CR unit 302 and determining the location accuracy (estimated, predetermined, or actual). The unit operating location and accuracy are represented as CR Unit Location Determination Error Region bounded by 306 in FIG. 3. The CR unit 302 then determines at step 204, an Allowed Location Error Region 310 by taking the difference 304 between the CR unit's Allowed Location Determination Error (typically provided by regulatory authorities) 308 and the unit's Location Determination Error 306. The Allowed Location Error Region 310 is shown as a shaded region in FIG. 3. A location-based CR system operating parameter, for example allowable CR system transmit power vs. location, is then derived at step 206 over the Allowed Location Error Region 310. In the case of allowable transmit power, the location within the Allowed Location Error Region that provides the maximum allowable CR system transmit power is selected and utilized by the unit (see below). In this manner, the CR unit optimizes a key system operating parameter (e.g., maximizes its transmit power) while still meeting regulatory requirements. It is also possible to optimize more than one system operating parameter using the described techniques. If the subscriber unit 302 moves, the method returns to step 200 to re-establish the current location and estimate accuracy.

Returning to steps 204 and 206, the Allowed Location Error Region 310 is determined by sweeping out a region bounded by a radial of length equal to the difference between the CR unit's Allowed Location Determination Error 308 (typically determined by CR system regulations) and the CR unit's own Location Determination Error 306 (estimated, predetermined, or actual). The difference value (i.e. region 308–region 306) is centered about the reported CR unit location to provide for the Allowed Location Error Region 310. The size (i.e., radius) of the Allowed Location Error Region 310 should be proportional to the amount that the CR unit's location accuracy exceeds (i.e., is better than) the allowed location determination error amount.

In the above method 200, at step 206 the CR unit uses geo-location information 116 (geo-location algorithms or a geo-location database) as described in conjunction with FIG. 1 to derive CR system operating parameters such as allowed transmission power vs. location vs. channel which are represented in FIG. 3 by data points 320. CR unit 302 can examine each (higher resolution) location point 320 contained within the Allowed Location Error Region 310, and select the operating point (location) with the maximum allowed transmission power (on a per channel or operating frequency basis) for CR system operation. In this manner, a CR unit with better than specified location accuracy will in general be allowed to transmit at higher power levels, and still meet regulatory requirements. In a similar manner, other CR system parameters (e.g., such as allowed operational bandwidth or transmit time duration) can also be optimized (e.g., maximized) over the Allowed Location Error Region 310. Those skilled in the art appreciate that there are numerous other location dependent system operating parameters that can be optimized (e.g., maximized or minimized) by applying the techniques of the described invention.

Figure 4:
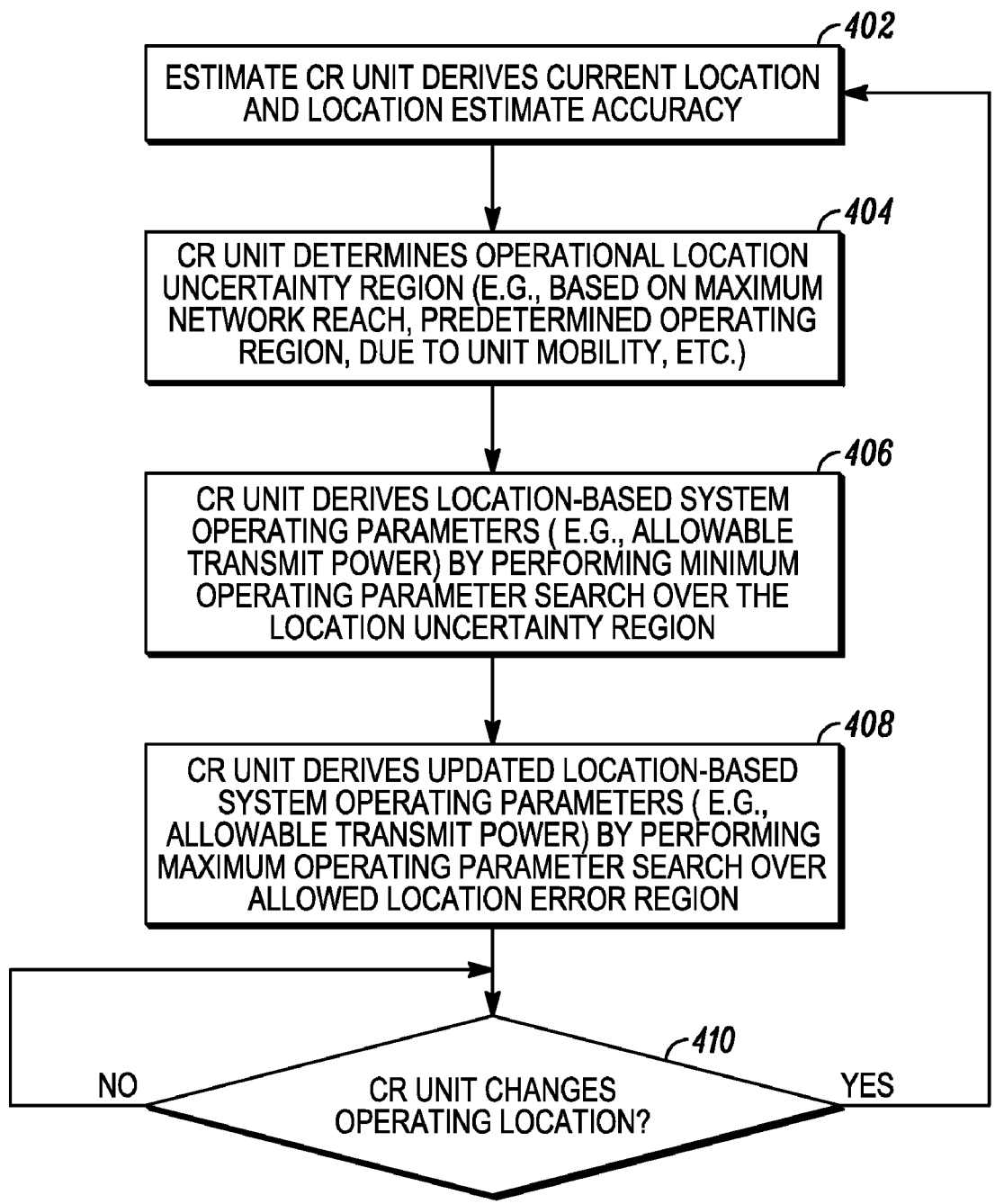
FIG. 4 illustrates a method of using location uncertainty in the determination of location-based operating parameters for a CR unit in accordance with an embodiment of the invention.
Figure 6:
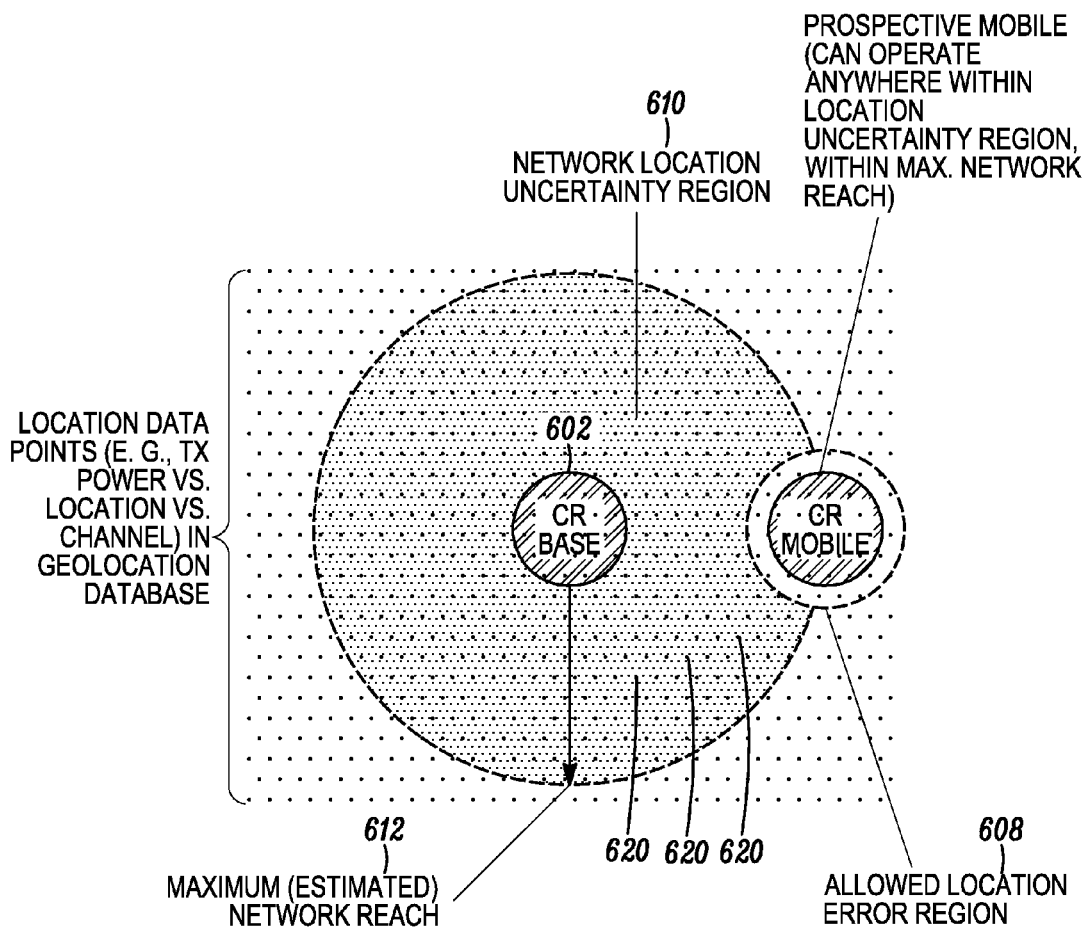
FIG. 6 illustrates a prospective subscriber that may operate anywhere within an operational Location Uncertainty Region about the CR base station in accordance with an embodiment of the invention.

FIG. 4 illustrates a method of applying location uncertainty to derive updated location-based operating parameters for a CR unit in accordance with an embodiment of the invention. FIG. 6 illustrates a prospective subscriber that may operate anywhere within an operational location uncertainty region about a CR base station in accordance in accordance with an embodiment of the invention. The CR unit of FIG. 4 will be described in terms of the base station 602 of FIG. 6.

Method 400 begins at step 402 by the CR unit estimating its operating location and deriving its location estimate accuracy. The location accuracy may be determined (e.g., estimated or derived in real-time) along with the CR unit's location, or it may be a predetermined value (e.g., stored within the CR unit). Those skilled in the art recognize that there are many different location determining means (e.g., global positioning system (GPS), time difference of arrival (TDOA), time of flight (TOF), etc.), each with an associated accuracy, that could be employed with no loss of generality or applicability to the described system. At step 404, the CR unit determines an Operational Location Uncertainty Region 610. The determination of the Operational Location Uncertainty Region 610 may be based on one or more factors such as maximum network reach, a predetermined operating region, and/or unit mobility, to name a few. In general, an operational location uncertainty region refers to an area where a CR unit may be operating, without exact knowledge of the CR unit's location (such that the CR unit is allowed to operate anywhere within the location uncertainty region and still meet regulations and other system operating constraints). In the case of a CR network where only the base station is location enabled (i.e., able to determine its location), the geographic size of the network (or maximum network reach) can be estimated to determine the location uncertainty region. In the case where the CR operating region is predetermined (e.g., to be within city limits), the location uncertainty region may be defined to be anywhere within the city limits. In the case of a mobile CR unit, its location uncertainty region may be defined as any area which may be assured to contain the moving CR unit over a period of time (e.g., possibly based on the maximum speed of the CR unit and the time period duration). Various forms of location uncertainty are fully described below.

Moving to step 406 in the flowchart of FIG. 4, the CR unit derives location-based system operating parameters. The location-based system operating parameters may include, for example, one or more of transmit power, operational bandwidth, transmit time duration, or other parameters related to the CR system. The CR unit derives the location-based system operating parameters by performing a minimum operating parameter search over the operational location uncertainty region 610 (on a per channel or operating frequency basis). The minimum operating parameter search is traditionally utilized to ensure that regulatory limits are met. Since there is uncertainty as to the actual CR unit location, the worst case location is being assumed (per potential operating channel) which results in one or more minimum operating parameters. Specifically, the CR unit (either directly or indirectly) searches all of the location data points (shown as 620 in FIG. 6) contained with the location uncertainty region 610, and selects the location with the minimum (or most conservative) CR system operating parameter. Those skilled in the art appreciate that this may be a minimization procedure (as in the case of allowable CR system transmit power or bandwidth), but may alternatively be a maximization procedure in other cases to arrive at the most conservative parameter value (to meet regulations).

Moving to step 408, the CR unit derives updated location-based system operating parameters (again these system operating parameters could be transmit power, operational bandwidth, transmit time duration, or other parameter related to the CR system). The CR unit derives the updated location-based system operating parameters by performing a maximum operating parameters search (per prospective operating channel) over the Allowed Location Error (illustrated as Region 310 in FIG. 3 or Region 608 in FIG. 6). Note that in this case, the Allowed Location Error Region (608/310) should be centered on the location of the above-determined minimum parameter (which is equivalent to a possible operating location of a prospective CR subscriber unit). Recall that the size of the Allowed Location Error Region (310/608) is related to the difference between the allowed location determination error and the actual (or estimated) CR unit location determination error (as described above, based on the device that estimates operating location). In this manner, the CR unit is able to optimize a system operating parameter (e.g., maximize CR transmit power) over an implied Allowed Location Error Region (610) to improve CR system performance, while still meeting regulatory requirements. To recap, the minimum operating parameter search is performed over shaded Location Uncertainty Region 610 in FIG. 6, and a maximum operating parameter search is performed over shaded Region 310 in FIG. 3 (or Region 608 in FIG. 6). As long as the CR base unit 602 does not move, the CR unit(s) will communicate using the maximum operating parameters within Network Uncertainty Region 610.

An example of Location data points 320 or 620 are shown in Table 1 below to help visualize the tradeoff that takes place across a location-based system operating parameter (for example transmit power) vs. location vs. channel.

| Example of System Operating Parameters vs. Prospective CR Unit Location | | | | |
|---|---|---|---|---|
| Prospective CR unit Location (e.g., GPS Coordinates) | Maximum Allowed Transmit Power for Channel 21 | Maximum Allowed Transmit Power for Channel 22 | Maximum Allowed Transmit Power for Channel 23 | Maximum Allowed Transmit Power for Channel 51 |
| 38.880 lat. 77.050 long. | 21 dBm | 25 dBm | 11 dBm | 5 dBm |
| 38.880 lat. 77.052 long. | 22 dBm | 23 dBm | 11 dBm | 3 dBm |
| 38.880 lat. 77.054 long. | 23 dBm | 21 dBm | 12 dBm | 1 dBm |
| 38.880 lat. 77.056 long. | 24 dBm | 21 dBm | 12 dBm | −2 dBm |

These location database points and their associated system operating parameters are determined utilizing geo-location algorithms or a (possibly pre-computed) geo-location database in the CR unit. The computation of these system operating parameters is typically based on regulatory requirements and is generally independent of the described minimization and maximization procedures. As an example of the maximization procedure, if the Allowed Location Error Region (310, 608) contains the four location coordinate points shown in Table 1, then the CR unit would be allowed to transmit with 24 dBm on Channel 21 (if selected), 25 dBm on Channel 22 (if selected), 12 dBm on Channel 23, . . . and 5 dBm on Channel 51. Note that in general, the CR unit will choose the channel with the highest allowed operational power (or allowed bandwidth or transmit time duration), which in this example, happens to be Channel 22 for transmit power. In another example, if the four location points in Table 1 encompass the Location Uncertainty Region (610), then the CR unit would be forced to choose the minimum operating power per channel (or 21 dBm on Channels 21 and 22, 11 dBm on Channel 23, and −2 dBm on Channel 51). Once again, in general, the CR unit would be free to transmit on the channel that allowed the highest operational power (e.g., Channel 21 and/or Channel 22 in this example). Also note in general that the operating Location Uncertainty Region (610) is typically larger than the Allowed Location Error Region (310 or 608) in practice.

If the CR unit changes operating location at step 410, the method returns to step 402 and the determination of parameters is evaluated based on the new location. If the CR unit moves such that Allowed Location Error Region 310 of the CR device decreases (due to an increase in the CR unit location estimate error 306), then available channels and maximum system operating parameters will generally decrease over the prior location.

To further expand on steps 404, 406, 408, a location enabled CR will always have some degree of error in its location estimate which must be addressed. This error may be caused by a variety of factors, such as (location signal) propagation conditions, estimated network reach, or terminal/network mobility. High mobility systems generally have higher location uncertainty causing the data to become outdated quickly, resulting in the equivalent of a location error (or expansion of the unit's Location Uncertainty Region). Even in systems utilizing GPS, time and operating location varying effects such as inclement weather, shadowing from foliage or urban canyon effects may limit the achievable location accuracy. Systems that utilize other location determining techniques (such as TDOA or RSSI-based techniques) may have even larger errors (e.g., on the order of hundreds of meters), and hence smaller Allowed Location Error Regions. Yet other (lower cost) CR systems may require automated or manual operator input (such as street address or locale/city) to determine location. One example of this may be in an in-home TVWS communication system, where the base may be linked to a cable box (which has a serial number that can be referenced to a residential street address). This form of input may also serve a back-up method if the primary location determination method fails.

Generally, unit location data is converted to latitude/longitude coordinate data along with an estimated location uncertainty/error to be fed into the location database operational algorithm, which determines (or outputs) the maximum allowed CR transmit power (or other CR system operating parameters) based on the input location values. Note that location inaccuracy may take several forms (due to location determination algorithms, mobility, network size, or other location resolution effects) as described below. The geo-location database or algorithms will generally contain, or be capable of, higher accuracy than the user equipment for the service region of interest. Each CR unit may individually be assigned a maximum allowable transmit power based on its estimated location and location error (assuming that each unit has some means of location estimation), or the base station may determine a global network TX power limit (e.g., for non-location enabled mobiles) by application of Location Uncertainty Regions described above.

Figure 5:
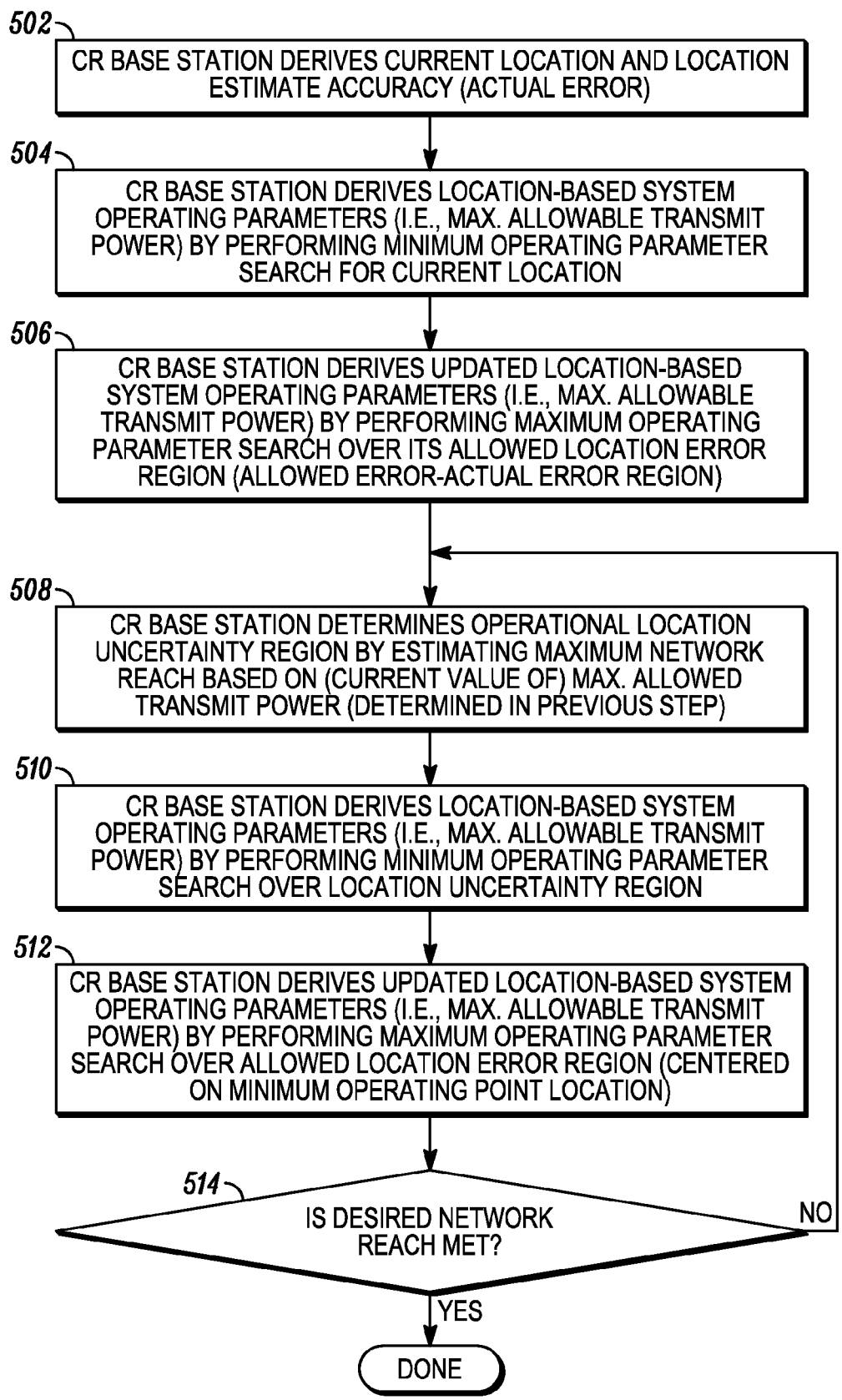
FIG. 5 illustrates a method of determining location-based system operating parameters for a CR base station to communicate with a prospective subscriber device in accordance with an embodiment of the invention.

Formally, FIG. 5 illustrates an iterative method of determining location-based system operating parameters for a cognitive radio (CR) base station to allow communication with a prospective subscriber CR device in accordance with another embodiment of the invention. FIG. 6 illustrates a prospective subscriber 608 that may operate anywhere within an Operational Location Uncertainty Region 610 about the CR base station 602 in accordance with an embodiment of the invention. As such, the determination of location-based system operating parameters will be discussed in conjunction with both FIGS. 5 and 6.

Method 500 begins at step 502 by the CR base station 602 deriving its current location and deriving its location accuracy. The location accuracy may be derived using an estimated location determination error (estimated within the CR base) or actual location determination error (stored within the base station) as was discussed in FIG. 3 with region 306.

At step 504, the CR base station determines its initial location-based system operating parameters. These system operating parameters may include, for example, one or more of transmit power, operational bandwidth, transmit time duration, or other parameter related to the transmitter of the CR base station. In this embodiment, the CR base station 602 determines its location-based system operating parameters by performing a minimum operating parameter search for the base station's current operating location. The minimum operating parameter search is utilized to ensure that regulation limits are met. Since there is uncertainty as to the actual location of the CR base 602, the worst case location is being assumed which results in one or more minimum operating parameters.

Moving to step 506, the CR base station 602 derives updated location-based system operating parameters. These system operating parameters may include, for example, one or more of transmit power, operational bandwidth, transmit time duration, or other parameter related to the transmitter of the CR base station. The CR base station 602 derives its updated location-based system operating parameters by performing a maximum operating parameter search over its Allowed Location Uncertainty Region. The Allowed Location Uncertainty Region for the CR base station 602 is determined as was described in conjunction with FIG. 3 by subtracting a Location Error Region (actual or estimate) 306 from an Allowed Location Determination Error (typically provided by the system regulations) 308 for the CR base 602. Note that steps 504 and 506 may alternatively be avoided if the CR base station assumes that transmission begins at the absolute maximum power levels generally allowed by regulation, and refines the power level estimate using the normal iterative procedure described (in steps 508-514) below.

Moving to step 508, the CR base station 602 determines its Operational Location Uncertainty Region 610. The Operational Location Uncertainty region 610 is determined by estimating maximum network reach 612 based on the current values of the maximum allowed system parameter (e.g., CR base transmit power) values determined at step 506, as described above. The maximum network reach should typically be based on conservative propagation models (e.g., free-space square law propagation) and the current value of allowed transmit power. Note that other parameters, such as CR base unit antenna pattern or directional gain may also be applied to refine the network reach estimate (based on the direction of desired communication). The CR base station then, at step 510, derives location-based system operating parameters using the described techniques. The location-based system operating parameters are derived by performing a minimum operating parameter search over the base station's Operational Location Uncertainty Region 610.

The CR bases station 602 then again derives updated location-based system operating parameters at step 512. The updated system operating parameters are derived by performing a maximum operating parameter search over the Allowed Location Error Region (which was determined at step 506, and is applied around the location of the minimum operating parameter determined in step 510). Steps 508, 510 and 512 are repeated until a desired network reach from base station 602 to subscriber unit 608 is achieved as checked at step 514. In general, the CR system will attempt to utilize the least amount of transmit power (or bandwidth) necessary to reach the desired subscriber unit, in order to minimize interference levels to incumbent systems and other CR systems.

For the global case, the database technique 500 takes into account the central user CR equipment location (e.g., that of the AP or controlling node), and based on the reported location inaccuracy of the networked unit(s), and/or the size of the network, examines locations around the central location point out to a geographic displacement equal to the estimated network size (or maximum network reach) plus central location error (i.e., the Location Uncertainty Region plus the Allowed Location Error Regions are examined as described above). Network size may be based on actual (measured) unit locations (plus errors), or estimated based on conservative maximum network reach/range models (e.g., CR transmit power, propagation models and link budgets). Total network reach should typically be based on CR base unit range to the farthest MS (based on its allowed TX power). This set of (enclosed) locations is examined as described in the paragraph immediately below to determine the CR network elements' (globally) permitted transmit power. Note that this may be an iterative process if network range is recomputed based on the updated allowed transmit power levels for a given region (as shown in steps 508-514 of FIG. 5), or is computed on a per-unit basis (see below). Steps 508-514 may be performed repeatedly (iteratively) until the desired network reach (or range) is obtained (shown in step 514). Note that the desired network range may vary depending on which subscriber unit the base is attempting to communicate with (whether it be a distant or near subscriber unit). In fact, the CR base unit may apply method 500 beginning with a relatively small desired network reach, and subsequently apply method 500 with relatively larger desired network reach values, in an attempt to establish contact with a mobile at an unknown range. Note that as network reach values are increased, CR system operating parameters, such as maximum allowed transmit power typically decrease (due to the correspondingly larger Location Uncertainty Region). In general, utilizing global CR network power limits will be lower than individualized unit power limits, as described below.

Generally speaking, the maximum allowed transmit power per channel is determined by taking the minimum allowed power value for the set of examined locations/operating region as described above (taking into account network size and all location errors/uncertainty). This method ensures that mandated CR system transmit power regulations are not exceeded. In this manner, the less accurate the location estimate is (or the larger the network size), the less transmit power (or less spectral opportunities) will be allowed for the CR system on a given channel (since the global CR transmit power limit is effectively determined by the intersection (i.e., the lower bound) of all of the individual allowed power levels). Thus, a user with poor location accuracy may have fewer higher power channels available to choose from, but the user will still have a functioning network in many cases. This inherent tradeoff allows even poor location accuracy CR systems to operate in the field, which could be important for certain emergency communications. An extreme example might occur if the location of a CR unit is only known to be within a city, where the worst operating point within the region must be chosen (per channel). The examination of the potential CR operating region may require a fair amount of computation for large location uncertainty regions. This can be alleviated by first examining the area for co-channel transmitters within the bounds of the region. Those channels that contain co-channel transmitters anywhere within the bounded Location Uncertainty Region may be eliminated from further consideration, since operation is typically not allowed inside their protected contours, and would be prohibited for the entire uncertainty region (as is the case for the TV spectrum white spaces in the United States). This technique (which could possibly be done off-line and the results stored) would eliminate many potential operational channels from the minimum power level search procedure described above, greatly speeding the allowed transmit power level determination process.

Significantly, if a network (102) or network element (108) is highly mobile, its exact location may not be precisely known vs. time, so that an intentional Location Uncertainty/ error can be incorporated into the unit's location, with similar effects as outlined above. This particular method has the additional desired benefit of reducing the required update rate of, and bandwidth for communicating both CR unit location changes and the resulting operational maximum allowed power level changes. With additional Location Uncertainty introduced for unit motion, the CR unit may change location due to mobility but still be within a general service area (whether that be within a 100 m or 2000 m area). One example of this technique involves a speeding police car: rather than sending location updates (say, accurate to within 10 m) and the resulting CR transmit power level changes every 100 milliseconds to a car (or cars) traveling 100 mph, reduce the location accuracy to 100 m and send the (lower spatial resolution) updates every second instead, advantageously reducing the required CR network control bandwidth. Note that power level updates generally need to be sent for all currently active and all potentially active CR operating channels. This basic method allows the user to trade off location accuracy (or reduced network control bandwidth) for spectral availability and/or system transmit power (which is directly related to the usable data rate). Other CR system parameters, such as operational (communications) bandwidth or allowed transmit time duration may be traded off in a similar manner (by altering the Location Uncertainty Region). Such techniques are especially important in CR networks with multiple highly mobile users.

Importantly, Federal and Regional Regulatory bodies (such as the FCC in the United States) will typically allow for some location determination error (e.g., of say 10-300 m of Allowed Location Determination Error), which can be utilized to the CR system's advantage. The described method 200 allows the CR unit to take full advantage of this by examining the allowed areas around the given location (within this Allowed Location Error amount minus any actual or estimated location estimation errors), and choosing the location with the best operating characteristics per available channel. For example, assume that CR unit location is known to within 10 m (the same as the underlying stored geo-location database), and that the FCC allows up to 300 m of location error in a unit. The described method 200 will search areas up to 290 m (300 m-10 m) around the unit's reported location, and choose the best data point (i.e., maximum allowed CR transmit power) for operation, once again, per channel. This has the effect of maximizing the CR system transmit power within the allowed error region. Importantly, note that the same location does not have to be applied for each channel in the database, as long as it is within the location error tolerance (304) allowed by regulations. Once again, note that even small location changes can have a large positive effect in CR systems with powerful error correcting codes (increasing their allowable transmit power and data throughput/error rate operating performance), due to the fact that allowable transmit power levels can shift relatively rapidly over certain geographic areas. This technique (illustrated in step 206) is in effect the reverse of the above minimum TX power set described above (illustrated in step 406 above), but is permitted by all proposed regulations, and is advantageous to the CR user (especially near contour edges and in most urban areas where allowed CR power levels may change rapidly). In general, any system parameter that is affected by location may be altered using the above described maximization and minimization techniques.

Furthermore, if the global maximum allowed transmit power for an operating CR system is determined via the database technique as described above 500 (e.g., for non-location enabled MSs), the value can be refined (starting at step 508) if the maximum network size/reach was estimated based on the absolute maximum allowed transmit power (e.g., 36 dBm in the TVWS). The maximum network size/reach value may be re-estimated based on the location database algorithm results described above (i.e., based on the possibly lower than absolute maximum allowed TX power results). This would result in a smaller maximum network reach (based on conservative propagation models), which in turn would affect the network size (or effective Location Uncertainty) fed into the described location database algorithm. Method 500 will generally result in a higher allowed CR user transmit power level in many cases after a limited number of iterations (e.g., after 3 iterations). The iterations can also be stopped once a desired network range is reached. Note that for symmetric networks, an attempt can be made to make the MS (uplink) range at least as large the AP/base (downlink) range, to ensure adequate two-way coverage. However, similar techniques may be applied when the base to subscriber link budget is different than the subscriber to base link budget.

Once again, note that the described location error and uncertainty techniques don't necessarily have to be employed globally over the entire operating CR network—they may be employed on a per-unit basis if desired (based on an individual unit's estimated location inaccuracy). In a similar manner, network size does not have to be globally estimated as a maximum communications range, it may be estimated based on individual CR unit location errors (e.g., if the units are all location enabled), and MS units may be allowed different transmit power levels based on their particular location and location error in the most general case. The base or AP unit would have to meet the transmit power level restrictions on the overall (possibly complex-shaped) CR network though, assuming that it is actively communicating to all of the MS units on a particular channel. Otherwise, only the subset of the MS units the AP is actively communicating with on channel need to be considered in the maximum allowable TX power level (or other system operating parameter) computations. This may be highly advantageous in certain CR network topologies. The penalty of individual unit-based geo-location database or algorithm computations is increased complexity due to multiple per-unit evaluations of the geo-location database and estimation of individual unit locations.

Finally, in cases where the geo-location database must be stored in CR units, there are methods based on the above techniques to increase the effective geographic coverage area of the database. Recall that local storage of the database (typically contained in 114) limits the practical size (or coverage area) of the database, primarily due to memory/cost limitations in CR units. While this is a valid limitation, much of it can be overcome by incorporating variable resolution (or accuracy) geo-location databases in CR equipment. This type of database would be structured such that the resolution would be high in the primary service areas (e.g., in a town's central areas) for public safety services, and the resolution would decrease in areas away from the primary service areas (out to some limit). For example, assume that an incorporated Township covers 10 square kilometers, the immediate surrounding Township areas cover 100 square kilometers, and the surrounding county covers 10,000 square kilometers. A variable resolution geo-location database could contain 50 m resolution for Township locations, 200 m resolution for the immediate surrounding areas, and 1000 m resolution for the surrounding county areas. This technique effectively reduces the memory storage requirements by a large factor (e.g., ~250× for this example), resulting in much smaller, lower-cost CR implementations. The variable resolution database can be based on the location uncertainty methods 200, 400, 500 described above, by first computing a high-resolution database for the entire region off-line, and reducing the resolution of the results (i.e., introducing effective location error/uncertainty and allowed error tolerance rules) for the variable/lower resolution regions using the methods described above.

In the embodiment of method 500, the CR base station 602 uses geo-location algorithms or a geo-location database as described in conjunction with FIG. 1 to derive CR system operating parameters such as allowed transmission power vs. location vs. channel which are represented in FIG. 6 by data points 620. CR base 602 can examine each (higher resolution) location point 620 contained within the Allowed Location Error Region (608), and select the operating point (location) with the maximum allowed transmission power for CR system operation. In this manner, a CR base 602 with better than specified location accuracy will in general be allowed to transmit at higher power levels, and still meet regulatory requirements. In a similar manner, other CR system parameters (e.g., such as operational bandwidth) can also be optimized (e.g., maximized) over the Location Uncertainty Region 610.

Accordingly, there has been provided a method and apparatus for easing location accuracy requirements to allow non-GPS means to be utilized for location determination. The described techniques and system allows a CR user to address Location Uncertainty and errors in a variety of forms. As discussed previously, location errors may be due to the inherent location-determining algorithms, network operating conditions, network size estimate errors, or network mobility. Techniques to deal with network mobility (FIGS. 2, and 4), and methods to take advantage of regulation-allowed location determination inaccuracies have been provided (FIGS. 2 and 5), as was an iterative CR transmit power-determining means (FIG. 5)

Variable resolution (accuracy) databases were also introduced which significantly reduce the implementation cost of CR-based geo-location databases. The use of geo-location databases allows the techniques provided by the embodiments of the invention to effectively and advantageously deal with location inaccuracy/errors. CR systems using the described techniques of the invention are able to transmit with higher data throughput levels (due to higher allowed transmit power levels, operational bandwidths, transmit time durations, and reduced network control overhead) and have reduced implementation costs.

The location-based determination of system operating parameters provided by the embodiments of the invention can be incorporated into any product or network that utilizes or can utilize location enabled Cognitive Radio technology. The error determination techniques provided by the embodiments of the invention also apply to any frequency bands where information is known about incumbent networks. The disclosed methods are applicable to a wide range of products and CR systems, including fixed-fixed systems, fixed-to-mobile systems, and mobile-to-mobile systems (as in ad-hoc or talk-around radio networks).

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method of utilizing a geo-location database to avoid interference from a cognitive radio (CR) unit to at least one primary incumbent system, comprising:
    estimating, at the CR unit, an Operational Location Uncertainty region for the CR unit, wherein the Operational Location Uncertainty Region comprises a plurality of location points, wherein estimating further comprises:
        estimating an operating location for the CR unit;
        estimating an operating location estimate accuracy for the estimated operating location;
        providing an allowed location determination error for the CR unit by a regulatory authority; and
        wherein an Allowed Location Error Region is determined as being centered on the operating location of the CR unit, and extends outward to a distance equal to the difference between the allowed location determination error and the operating location estimate accuracy;
    deriving, from the geo-location database, a plurality of location-based system operating parameters that are capable of avoiding interference to the at least one primary incumbent system, wherein the geo-location database represents each of the plurality of location points in the Operational Location Uncertainty Region by a corresponding location-based system operating parameter;
    examining the corresponding location-based system operating parameter at each of the plurality of location points in the Operational Location Uncertainty Region to determine a location-based system operating parameter from among the plurality of location points; and
operating the CR unit with the determined location-based system operating parameter that avoids interference to the at least one primary incumbent system, and further comprising:
    determining an updated location-based system operating parameter by selecting a maximum location-based system operating parameter from among a plurality of location points over the Allowed Location Error Region, wherein a location point corresponding to a center of the Allowed Location Error Region is a location point corresponding to a minimum location-based system operating parameter selected from among the plurality of location points in the Operational Location Uncertainty Region; and
    operating the CR unit using the updated location-based system operating parameter.

2. The method of claim 1, further comprising repeating the steps of estimating through operating the CR unit in response to a change in the Operational Location Uncertainty region for the CR unit.

3. The method of claim 1, wherein the determined location-based system operating parameter comprises at least one of: an allowed transmit power, an allowed operating bandwidth, an allowed transmit time duration.

4. The method of claim 1, further comprising determining the location-based system operating parameter by selecting a maximum location-based system operating parameter from among a plurality of location points over the Allowed Location Error Region, wherein the geo-location database represents each of the plurality of location points over the Allowed Location Error Region by a corresponding location-based system operating parameter.

5. The method of claim 3, where the transmit power level is determined as a minimum of a plurality of transmit power levels from among the plurality of location points in the Operational Location Uncertainty Region.

6. The method of claim 1, wherein the geo-location database is stored with variable spatial resolution.

7. The method of claim 6, wherein the spatial resolution of the geo-location database decreases as distance from a central CR unit operating location increases.

8. The method of claim 1, wherein the Operational Location Uncertainty Region is determined by one of: estimating a maximum network reach, determining an actual network reach, CR unit mobility and a predetermined operating region.

9. The method of claim 8, wherein the maximum network reach is estimated from at least one of: an allowed transmit power level, antenna pattern data, a directional antenna gain.

10. The method of claim 1, further comprising adjusting the estimated Operational Location Uncertainty Region based on mobility of the CR unit over an area in which the CR unit is contained and traversing over a period of time.

11. A cognitive radio (CR) communication network, comprising:
    a CR base station located within a network Location Uncertainty Region, the CR base station having an estimated maximum network reach and further storing a geo-location database comprising CR system operating parameters;
    a prospective subscriber CR device, the prospective subscriber CR device having an Allowed Location Error Region about its center; and
    the prospective subscriber CR device increasing its Location Uncertainty about the network Location Uncertainty Region in exchange for a decrease in available channels from the CR base station and a decrease in transmit power from the CR base station;
    wherein the CR base station accesses the geo-location database to derive CR system operating parameters that are capable of avoiding interference to at least one primary incumbent system and further wherein the CR base station examines the derived CR system operating parameters by applying a maximization technique for trading off the Location Error Region for maximum allowed system operating parameters and applying a minimization technique for trading off the Location Uncertainty Region for minimum allowed system operating parameters to utilize a least amount of transmit power for communicating with the prospective subscriber device while avoiding interference to the at least one primary incumbent system; and,
    the network Location Uncertainty Region and Allowed Location Error Region being updated in response to an update in the location of the subscriber CR device; and
    the CR system operating parameters being updated in response to the update in the at Allowed Location Error Region or Location Uncertainty Region; and
    the prospective subscriber CR device being operated with the updated location-based system operating parameters that avoid interference to the at least one primary incumbent system.

12. The cognitive radio of claim 11, wherein the CR system operating parameters include the transmit power.

13. A method of updating a cognitive radio (CR) location-based operating parameters for communicating within a CR communication network comprising:
   determining, at the CR unit, an Allowed Location Error Region for the CR unit, wherein the Allowed Location Error Region comprises a plurality of location points;
   determining, at the CR unit, an Operational Location Uncertainty Region of the CR unit, wherein the Operational Location Uncertainty Region comprises a plurality of location points;
   deriving, from a geo-location database, a plurality of location-based system operating parameters that are capable of avoiding interference to at least one primary incumbent system, wherein the geo-location database represents each location point in the Allowed Location Error Region and the Operational Location Uncertainty Region by a corresponding location-based system operating parameter;
   examining the corresponding location-based system operating parameter at each of the plurality of location points in the operational Location Uncertainty Region to determine a minimum location-based system operating parameter from among the plurality of location points, wherein a location point corresponding to a center of the Allowed Location Error Region is a location point corresponding to the minimum location-based system operating parameter;
   examining the corresponding location-based system operating parameter at each of the plurality of location points in the Allowed Location Error Region to determine a maximum location-based system operating parameter from among the plurality of location points;
   updating the CR location-based system operating parameters with the maximum location-based system operating parameter; and
   operating the CR unit with the maximum location-based system operating parameter that avoids interference to the at least one primary incumbent system.

14. The method of claim 13, wherein the location-based system operating parameters comprise at least one of: a maximum allowable transmit power, an allowable operational bandwidth, an allowable transmit time duration.

15. The method of claim 13 wherein the operational Location Uncertainty Region is determined based on one or more of: a maximum network reach, a predetermined operating region, CR device mobility.

16. The method of claim 13, wherein the minimum location-based system operating parameter corresponds to a least amount of transmit power level and further wherein the least amount of transmit power level is determined as a minimum of a plurality of transmit power levels from among the plurality of location points in the Operational Location Uncertainty Region.

17. The method of claim 14, wherein the maximum location-based system operating parameter corresponds to the maximum allowable transmit power level and further wherein the maximum allowable transmit power level is determined as a maximum of a plurality of transmit levels from among the plurality of location points in the Allowed Location Error Region.

18. The method of claim 13, wherein the Allowed Location Error Region is determined by a current location of the CR unit, location estimate accuracy of the CR unit and an allowed location determination error for the CR unit.

19. A cognitive radio (CR) device, comprising:
   a transmitter;
   a controller coupled to the transmitter, the controller and transmitter maintaining a geo-location database comprising system operating parameters for the CR device; and
   the CR device operating within an Operation Location Uncertainty region comprising a plurality of location points, and the CR device having an Allowed Location Error Region about its center, the CR device accessing the geo-location database to derive CR system operating parameters that are capable of avoiding interference to at least one primary incumbent system and further trading off between both available channels and maximum system operating parameters, such that as Location Uncertainty of the CR device increases, available CR channels and CR system operating parameters decrease, wherein the CR device is operated with the decrease in CR system operating parameters that avoid interference to the at least one primary incumbent system;
   wherein the derived CR system operating parameters correspond to transmit power levels, and further wherein the maximum system operating parameters include a maximum allowable transmit power level that is determined as a maximum of a plurality of transmit power levels from among the plurality of location points in the Allowed Location Error Region, and further wherein the minimum allowed system operating parameters include a least amount of transmit power level that is determined as a minimum of a plurality of transmit power levels from among the plurality of location points in the Operation Location Uncertainty Region; and
   the Location Uncertainty being updated based on updates to the location of the CR device, and the CR system operating parameters being updated in response to the update in the Location Uncertainty; and the CR device being operated with the updated CR system operating parameters that avoid interference to the at least one primary incumbent system.

20. The method of claim 19, wherein each derived system operating parameter corresponds to a transmit power level and further wherein the CR device determines a least amount of transmit power level from among a plurality of transmit power levels for communication.

21. The CR device of claim 19, wherein the CR device comprises a mobile CR radio operating within a public safety network.

22. A method of communicating in a cognitive radio (CR) communication network having at least a mobile CR unit, comprising:
   at the mobile CR unit:
   estimating the location of the mobile CR unit;
   determining at least one of an Allowed Location Error Region or Operational Location Uncertainty Region for the CR unit, wherein the Allowed Location Error Region or the Operational Location Uncertainty Region comprises a plurality of location points—
   deriving, from a geo-location database, a plurality of location-based system operating parameters that is capable of avoiding interference to at least one primary incumbent system, wherein the geo-location database represents each location point in the Allowed Location Error Region or the Operational Location Uncertainty Region by a corresponding location-based system operating parameter, wherein each derived location-based system operating parameter corresponds to a transmit power level;

examining the corresponding location-based system operating parameter at each of the plurality of location points either in the Allowed Location Error Region or Operational Location Uncertainty Region to determine a location-based system operating parameter from among the plurality of location points, wherein the step of examining, comprises:

determining the Allowed Location Error Region for the CR unit and applying a maximization technique for trading off Location Error Region for maximum allowed system operating parameters, wherein the maximum allowed system operating parameters include a maximum allowable transmit power level that is determined as a maximum of a plurality of transmit power levels from among the plurality of location points in the Allowed Location Error Region; and determining the Operational Location Uncertainty Region for the CR unit and applying a minimization technique for trading off a Location Uncertainty Region for minimum allowed system operating parameters, wherein the minimum allowed system operating parameters include a least amount of transmit power level that is determined as a minimum of a plurality of transmit power levels from among the plurality of location points in the Operation Location Uncertainty Region;

updating the at least one of Location Uncertainty Region and Location error Region based on an update in the location of the mobile CR unit; and updating the location-based system operating parameter in response to the update in the at least one of the Allowed Location Error Region or Operational Location Uncertainty Region; and operating the CR unit with the updated location-based system operating parameter that avoids interference to the at least one primary incumbent system.

23. The method of claim 22, wherein the location-based system operating parameter comprises a global CR transmit power limit utilized by the mobile CR unit within the Operational Location Uncertainty Region.

24. The method of claim 22, wherein the communication network comprises an in-home television spectrum white spaces (TVWS) communication system, and wherein the location of the CR unit is derived from a home address linked to a cable set top box located in the home.

25. The method of claim 22, wherein the location of the mobile CR unit is derived based on an input that includes one or more of street address, locale and city.

26. The method of claim 22, wherein the Location Uncertainty Region is determined by estimating maximum network reach.

27. The method of claim 26, wherein maximum network reach is based on propagation models and the current value of allowed transmit power.

28. The method of claim 22 wherein the location-based system operating parameter comprises one or more of: CR base unit antenna pattern, directional antenna gain applied to refine the network reach estimate.

29. The method of claim 22, wherein the mobile CR unit operates within a Public Safety Network.

30. The method of claim 22, wherein the step of determining further comprises:

determining the Operational Location Uncertainty Region for the CR unit, determining that there are co-channel transmitters operating within the Operational Location Uncertainty region; and examining the corresponding location-based system operating parameter at each of the plurality of location points in the Operational Location Uncertainty Region to determine the location-based system operating parameter without examining the location-based system operating parameter at one or more location points corresponding to the co-channel transmitters.

31. The method of claim 1, further comprising:

determining that there are one or more communication devices operating in the Operational Location Uncertainty Region on a co-channel corresponding to a channel of the CR unit; and examining the corresponding location-based system operating parameter at the plurality of location points in the Operational Location Uncertainty Region to determine the location-based system operating parameter from among the plurality of location points without examining the location-based system operating parameter at one or more location points corresponding to the one or more communicating devices.

32. The method of claim 1, further comprises:

operating the CR unit in a home television spectrum white spaces (TVWS) communication system, and wherein a location of the CR unit is derived from a home address linked to a cable set top box located in the home.

* * * * *

UNITED STATES PATENT AND TRADEMARK OFFICE
CERTIFICATE OF CORRECTION

PATENT NO. : 8,213,954 B2
APPLICATION NO. : 11/845940
DATED : July 3, 2012
INVENTOR(S) : Gurney et al.

It is certified that error appears in the above-identified patent and that said Letters Patent is hereby corrected as shown below:

On the Title Page, Item "56", under "FOREIGN PATENT DOCUMENTS", Line 1, delete "WO 0036863 A 6/2000".

In Fig. 5, Sheet 5 of 6, insert -- 500 --, above the figure.

In Column 3, Line 26, delete "pubic" and insert -- public --, therefor.

In Column 12, Line 36, delete "2," and insert -- 2 --, therefor.

In Column 12, Line 40, delete "(FIG. 5)" and insert -- (FIG. 5). --, therefor.

In Column 14, Line 7, in Claim 5, delete "where" and insert -- wherein --, therefor.

In Column 14, Line 57, in Claim 11, delete "and," and insert -- and --, therefor.

In Column 14, Line 62, in Claim 11, delete "in the at" and insert -- in the --, therefor.

In Column 16, Line 40, in Claim 20, delete "method" and insert -- CR device --, therefor.

In Column 16, Line 51, in Claim 22, delete "unit:" and insert -- unit; --, therefor.

In Column 16, Line 57, in Claim 22, delete "points-" and insert -- points; --, therefor.

In Column 18, Line 7, in Claim 27, delete "wherein" and insert -- wherein the --, therefor.

Signed and Sealed this
Eighth Day of January, 2013

David J. Kappos
*Director of the United States Patent and Trademark Office*